United States Patent [19]
Nakatani et al.

[11] Patent Number: 4,620,203
[45] Date of Patent: Oct. 28, 1986

[54] ELECTROSTATIC IMAGE FORMING APPARATUS USING FIELD EFFECT TRANSISTORS

[75] Inventors: Kaname Nakatani, Osaka; Yoshiaki Kato, Ikaruga, both of Japan

[73] Assignee: Mita Industrial Co., Ltd., Osaka, Japan

[21] Appl. No.: 802,329

[22] Filed: Nov. 27, 1985

[30] Foreign Application Priority Data

Nov. 30, 1984 [JP] Japan ............................... 59-251658

[51] Int. Cl.[4] ............................................ G01D 15/06
[52] U.S. Cl. ................................ 346/153.1; 350/539; 350/519; 350/573; 430/31
[58] Field of Search ....................... 346/153.1; 430/31; 350/23.7, 41, 45

[56] References Cited

U.S. PATENT DOCUMENTS 4,448,867 5/1984 Ohkubo et al. .............. 346/153.1 X

*Primary Examiner*—John D. Welsh
*Attorney, Agent, or Firm*—Sherman & Shalloway

[57] ABSTRACT

Disclosed is an electrostatic image forming apparatus comprising a layer composed of a dielectric material or a photoconductor, image element electrodes arranged in the form of a matrix on one surface of said layer, field effect transistors affiliated with the image element electrodes and interposed between the image element electrodes, and a developing electrode arranged on the other surface of the dielectric material or photoconductor layer, to which a voltage is applied.

In this electrostatic image forming apparatus, a toner image can be directly formed by a digital signal or image signal without performing any optical scanning or charging operation.

4 Claims, 2 Drawing Figures

ELECTROSTATIC IMAGE FORMING APPARATUS USING FIELD EFFECT TRANSISTORS

BACKGROUND OF THE INVENTION (1) Field of the Invention

The present invention relates to an electrostatic image forming apparatus. More particularly, the present invention relates to an electrostatic image forming apparatus in which a toner image can be directly formed by a digital signal without optical scanning or corona charging.

(2) Description of the Prior Art

An electrophotographic process is generally used for forming an electrostatic image. For example, a photosensitive plate having a photoconductive layer is uniformly corona-charged and the plate is exposed imagewise to light by optical scanning to form an electrostatic image corresponding to the original image. Then, this electrostatic image is developed with toners charged with a polarity reverse to the polarity of the electrostatic image and the toner image is transferred to a copy sheet to obtain a print. Optical scanning exposure is indispensable for the electrophotography, and the sensitivity is limited because of the photoconductive layer used. Accordingly, the electrophotographic process is still insufficient in that the speed of forming prints cannot be highly increased.

As the conventional method for forming an electrostatic latent image based on electric signals, there is known an electric recording method in which a dielectric material is used for the recording layer, a needle electrode and a confronting electrode are arranged so that the dielectric recording layer is sandwiched between the two electrodes, and a recording signal is applied between the two electrodes. This method, however, has a defect concerning the image quality. For example, tailing is readily caused. Therefore, this recording method is not widely adopted at the present.

Furthermore, the charging operation is generally necessary in the conventional image forming processes. If a toner image can be directly formed by a digital signal or image signal without optical scanning or corona charging, a great operational advantage will be attained.

SUMMARY OF THE INVENTION

It is therefore a primary object of the present invention to provide an electrostatic image forming apparatus in which a toner image can be directly formed from a digital signal or image signal without performing optical scanning or corona charging.

Another object of the present invention is to provide an electrostatic image forming apparatus comprising an active matrix having field effect transistors (FET) built therein.

More specifically, in accordance with the present invention, there is provided an electrostatic image forming apparatus comprising a layer composed of a dielectric material or a photoconductor, image element electrodes arranged in the form of a matrix on one surface of said layer, field effect transistors affiliated with the image element electrodes and interposed between the image element electrodes, and a developing electrode arranged on the other surface of the dielectric material or photoconductor layer, to which a voltage is applied.

Figure 1:
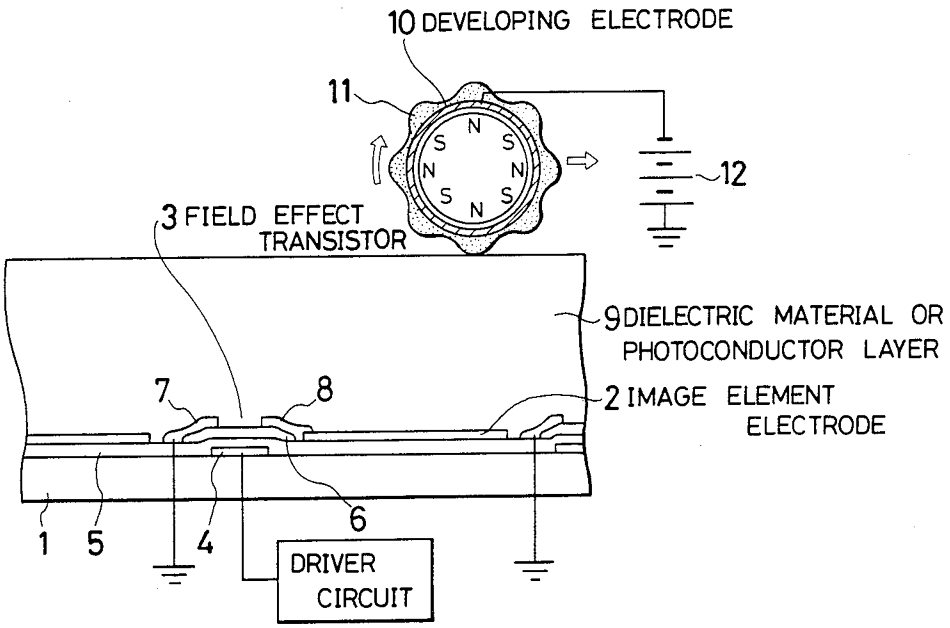
FIG. 1 is an enlarged sectional diagram illustrating the sectional structure of the electrostatic image forming apparatus according to the present invention.

In the drawings, reference numerals 2, 3, 9 and 10 represent an image element electrode, a field effect transistor, a dielectric material or photoconductor layer and a developing electrode. respectively.

DETAILED DESCRIPTION OF THE PREFERRED EMBODIMENTS

The present invention will now be described in detail with reference to the embodiments illustrated in the accompanying drawings.

Referring to FIG. 1 illustrating the sectional structure of the image forming apparatus according to the present invention, on one surface of a substrate 1, image element electrodes 2 are arranged in the form of a matrix, and field effect transistors represented as a whole by reference numeral 3 are arranged. The field effect transistors 3 comprise, for example, a gate electrode 4 formed on the substrate 1, a gate insulating film 5 covering the substrate 1 and the gate electrode 4 formed on the substrate 1, said insulating film 5 being composed of, for example, $\alpha$-$Si_3N_4$:H, a semiconductor 6 such as $\alpha$-Si:H formed on the gate insulating film 5 to correspond to the gate electrode 4, a source electrode 7 connected to one end of the semiconductor 6, and a drain electrode connected to the other end of the semiconductor 6.

The image element electrodes 2 are arranged on the insulating film 5 so that they are connected to the drain electrode 8. The source electrode 7 is earthed. Accordingly, the field effect transistors 3 are interposed between the image element electrodes 2 and the earth. The gate electrode 4 is connected to a known vertical scanning circuit (driver circuit), though it is not shown in the drawings.

A continuous layer 9 of a dielectric material or a photoconductor is formed to entirely cover the image element electrodes 2 and the field effect transistors 3. A developing electrode 10 such as a developing sleeve is arranged on this dielectric material or photoconductor layer 9. A developer 11 is retained on the surface of the developing electrode 10, which is connected to a power source 18.

The principle of the formation of an image in the apparatus having the above-mentioned structure will now be described.

Figure 2:
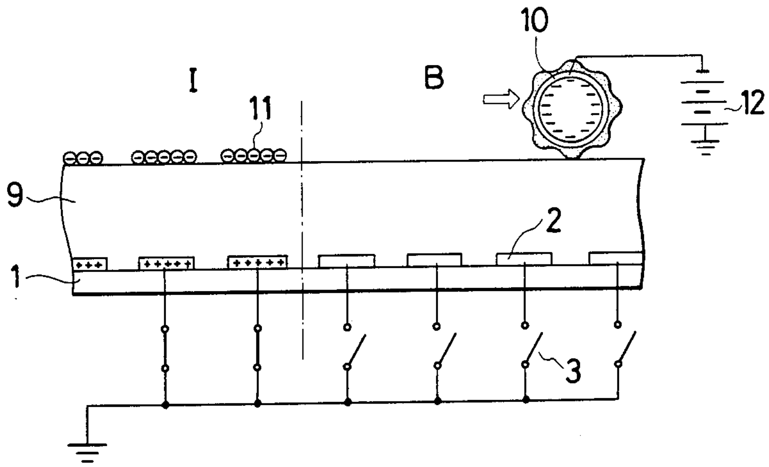
FIG. 2 is a diagram illustrating the operation principle of the apparatus shown in FIG. 1.

Referring to FIG. 2 illustrating the principle of the formation of an image in the image output apparatus according to the present invention and FIG. 1, the field effect transistor (FET) 3 is shown as a switching element. Synchronously with the operation of the developing electode 10, an electric signal from the driver circuit is put in the gate electrode 4 of the field effect transistor 3. By this electric signal, the field effect transistor 3 is rendered conductive between the source electrode 7 and the drain electrode 8 through the semiconductor 6, and the earthed state (ON state) and the non-earthed state (OFF state) are formed among the image element electrodes 2.

A voltage of the same polarity as that of the toner 11 used is applied to the developing electrode 10. For example, in the embodiment shown in FIG. 2, the toner 11 is negatively charged, and a negative voltage is applied to the electrode 10 from the power source 12. A charge of a polarity reverse to the polarity of the developing electrode 10, for example, a positive charge in this embodiment, is induced in the earthed image element electrodes 2, and an electric field is formed between the developing electrode 10 and the image element electrodes 2. By the action of this electric field, a repulsive action to the dielectric material or photoconductor layer 9 from the developing electrode 10 is caused on the toner 11, with the result that on the surface I of the dielectric material or photoconductive layer 9 where the image element electrodes 2 are in the earthed state, development with the toner 11 is effected. On the other hand, on the surface B of the dielectric material or photoconductor layer 9 where the image element electrodes 2 are in the non-earthed state, the reverse charge is not induced in the image element electrodes, and therefore, no electric field is formed and development with the toner 11 is not effected. Accordingly, in the apparatus of the present invention, a toner image having a high contrast and a high density can be formed without optical scanning or charging.

A developing current (current charged in the surface of the dielectric material) necessary for effecting the reverse development on the dielectric material or photoconductor layer is of an order of 0.2 $\mu A/cm^2$. If the size of the image element electrode is 200 $\mu m \times 200$ $\mu m$, the current charged into the image element electrode is of an order of $10^{-4}$ $\mu A$, and the on/off current of the field effect transistor is of an order of $10^{-6}$ to 1 $\mu A$. Accordingly, it will be readily understood that earthing/non-earthing switching can be accomplished.

According to the present invention, by using the above-mentioned image element electrode and field effect transistor (FET) in combination, a toner image can be directly formed by an electric signal of an extremely small output according to the principle of the reverse development without performing an optical scanning or charging operation.

In the apparatus of the present invention, as the substrate 1, there can be used a glass sheet, a plastic sheet or film, a ceramic plate and an insulating resin-coated metal plate. The field effect transistor may be formed from a known material according to known procedures.

The image element electrode 2 is formed of an electroconductive metal such as aluminum, silver, gold, tin or copper, and it is ordinarily formed by vacuum deposition of such a metal. It is preferred that the shape of the image element electrode be a square shape, but it may have a circular, triangular or hexagonal shape or other optional shape. It is generally preferred that the diameter or one side of the image element electrode be 10 to 1000 $\mu m$.

A polymeric dielectric material, for example, a thermoplastic polyester such as polyethylene terephthalate, a polycarbonate, an acrylic resin, a polystyrene resin, an epoxy resin, a silicone resin or a polyurethane resin may be used as the dielectric material. As the photoconductor, there can be mentioned inorganic photoconductors such as amorphous selenium, amorphous silicon, selen-tellurium, selen-arsenic, cadmium sulfide, selen sulfide and tellurium sulfide, and organic polymeric photoconductors such as polyvinylcarbazole. Moreover, a composition formed by dispersing an inorganic photoconductor as mentioned above or an organic photoconductor such as a phthalocyanine pigment, a perylene pigment, a quinacridone pigment, a pyranthrone pigment or a polyazo pigment into a polymeric dielectric material may be used.

In the present invention, if a photoconductive layer is used as the layer covering the image element electrode, there can be attained an advantage that if the output apparatus is exposed to light after formation of an electrostatic image, the residual charge can be erased simply and easily.

The photoconductive layer that can be used is not limited to those mentioned above. As another example, there can be mentioned a layer of a dispersion of a photoconductor as mentioned above as a charge-generating pigment in a continuous phase of a charge-transporting substance, and a photoconductive layer having a laminate structure comprising a charge-generating layer and a charge-transporting layer formed thereon.

It is preferred that the thickness of the dielectric material or photoconductor layer be 0.1 to 200 $\mu m$, especially 2 to 30 $\mu m$, though the preferred thickness differs to some extent according to the potential of the electrostatic image.

A developing apparatus having an electroconductor or semiconductive surface and being capable of holding toners on the surface thereof can be used as the developing apparatus in the present invention. A magnetic brush developing apparatus comprising a non-magnetic sleeve having an electroconductive surface, for example, an aluminum sleeve, and a magnetic roll contained in the sleeve, at least one of the sleeve and roll being rotatable, is especially preferably used for attaining the object of the present invention.

A one-component type magnetic toner customarily used in the electrophotography or a two-component type developer comprising a toner and a magnetic carrier can be used as the toner 11. The toner may be high resistance, or a conductive toner may be used so that an electroconductive path to the dielectric material or photoconductor layer is formed.

A direct current power source of 30 to 2000 volts is ordinarily used as the power source for the developing electrode.

Formation of an image in the apparatus of the present invention can be carried out according to the above-mentioned principle. The function of the field effect transistor is generally exerted by application of a voltage of several volts to scores of volts, though the applied voltage is changed to some extent according to the kind of the semiconductor used.

The formed toner may be transferred and fixed on a transfer sheet by electrostatic means to form a print, according to need.

We claim:

1. An electrostatic image forming apparatus comprising a layer composed of a dielectric material or a photoconductor, image element electrodes arranged in the form of a matrix on one surface of said layer, field effect transistors affiliated with the image element electrodes and interposed between the image element electrodes, and a developing electrode arranged on the other surface of the dielectric material or photoconductor layer, to which a voltage is applied.

2. An image forming apparatus as set forth in claim 1, wherein the diameter or one side of the image element electrode is 10 to 1000 $\mu m$.

3. An image forming apparatus as set forth in claim 1, wherein the thickness of the dielectric material or photoconductor layer is 0.1 to 200 $\mu m$.

4. An image forming apparatus as set forth in claim 1, wherein a direct current power source of 30 to 2000 volts is used for the developing electrode.

* * * * *